W. P. MILLER.
Nut-Lock.

No. 227,812.  Patented May 18, 1880.

Witnesses
Fred. G. Dieterich
B. L. Dieterich

Inventor
Wm. P. Miller
by Daniel Breed
Atty

UNITED STATES PATENT OFFICE.

WILLIAM P. MILLER, OF TIPTON, MISSOURI.

NUT-LOCK.

SPECIFICATION forming part of Letters Patent No. 227,812, dated May 18, 1880.

Application filed February 24, 1880.

*To all whom it may concern:*

Be it known that I, WILLIAM P. MILLER, a citizen of the United States, residing at Tipton, in the county of Moniteau and State of Missouri, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention consists of a novel construction of hinged or hooked plate, in combination with a hook or hinge on the washer-plate and a spring-catch, with other devices, all of which will be understood by the following specification.

Figure 1:
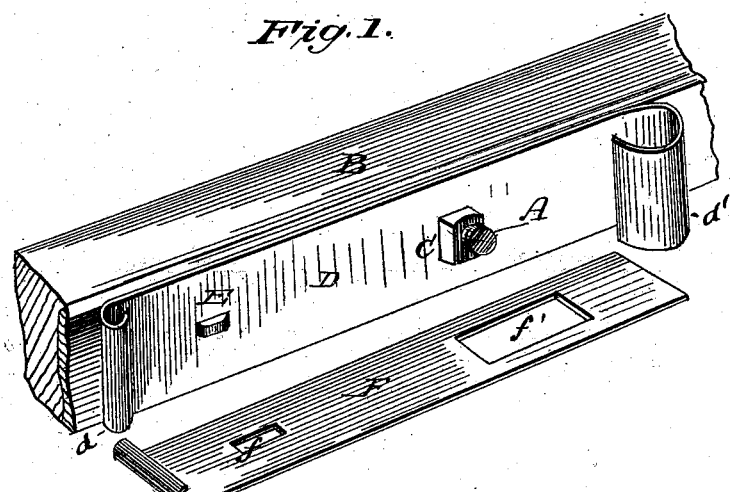
Figure 2:
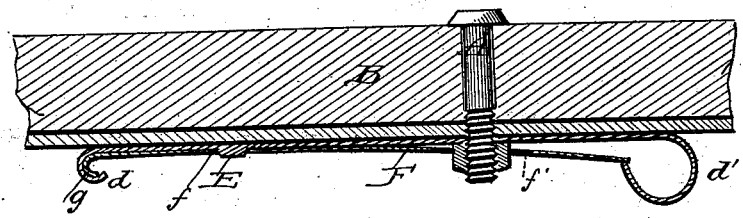
Figure 3:
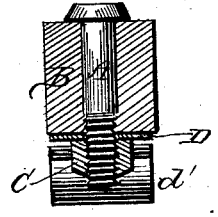

Figure 1 is a perspective view of my nut-lock, the locking-plate being detached and shown separate. Fig. 2 is a longitudinal section thereof. Fig. 3 is a transverse section.

The object of my invention is to make a cheap, simple, effective, and easily-operated nut-lock.

In the drawings, A represents a bolt passing through the bar B, and provided with a nut, C.

One end of the washer-plate D has a hook, $d$, and the other end has a spring-catch, $d'$, for holding the locking-plate, when brought home, into position, as will be soon explained. Upon this locking-plate is a wart or lug, E, to fit a small slot, $f$, in the locking-plate F, which also has a larger slot, $f'$, to fit or clasp the nut C, as shown in Fig. 2. This locking-plate F has a hook, $g$, at one end, which is first hooked under the small hook $d$ on the end of the washer-plate D, and then this plate is pressed down so that the slot $f'$ embraces the nut C, and then the straight end of the locking-plate is pressed home and caught by the spring-catch $d'$, thus immovably locking the nut in place.

Now, in order to remove the nut the spring-catch $d'$ is pushed back until the straight end of the locking-plate F is released, and then this plate is removed, when the nut is free to turn. The wart or lug E prevents the lock-plate from sliding sidewise, and the spring-catch and hook or hinge hold it from sliding endwise.

I do not broadly claim a slotted locking-plate for holding nuts; but I find this an improvement upon the nut-lock for which a patent was granted to me December 23, 1879, for plate with a spring or flexible end, as above described.

Having described my invention, what I claim is—

The locking-plate F, having a slot to fit the nut C, and also a slot or depression to catch the wart or lug E, and the hook $g$, hooked or hinged to the washer-plate D, and held in place by the spring-catch $d'$, substantially as set forth.

In testimony whereof I affix my signature in presence of two witnesses.

WILLIAM P. MILLER.

Witnesses:
 DANIEL BREED,
 GEO. F. GRAHAM.